(12) United States Patent
Chen et al.

(10) Patent No.: US 10,516,659 B2
(45) Date of Patent: Dec. 24, 2019

(54) USER INFORMATION OBTAINING METHOD AND APPARATUS, AND SERVER BY AN ORGANIZATION TO DELIVER TARGATED DATA TO THE USER

(71) Applicant: TENCENT TECHNOLOGY (SHENZHEN) COMPANY LIMITED, Shenzhen (CN)

(72) Inventors: Hao Chen, Shenzhen (CN); Maowei Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 234 days.

(21) Appl. No.: 15/621,408

(22) Filed: Jun. 13, 2017

(65) Prior Publication Data

US 2017/0279794 A1 Sep. 28, 2017

Related U.S. Application Data

(63) Continuation of application No. PCT/CN2016/072143, filed on Jan. 26, 2016.

(30) Foreign Application Priority Data

Feb. 12, 2015 (CN) .......................... 2015 1 0075316

(51) Int. Cl.
*H04L 29/06* (2006.01)
*G06F 21/31* (2013.01)
*G06F 21/41* (2013.01)
*H04W 12/08* (2009.01)

(52) U.S. Cl.
CPC .......... *H04L 63/0815* (2013.01); *G06F 21/31* (2013.01); *G06F 21/41* (2013.01); *H04W 12/08* (2013.01)

(58) Field of Classification Search
CPC ..... H04L 63/0815; H04L 29/06; G06F 21/31; G06F 21/41; H04W 12/08
(Continued)

(56) References Cited

U.S. PATENT DOCUMENTS 6,836,799 B1 * 12/2004 Philyaw ................. G06Q 30/02
709/224
9,178,868 B1 * 11/2015 Leung ..................... H04L 67/02
(Continued)

FOREIGN PATENT DOCUMENTS

CN 102710640 A 10/2012
CN 103347002 A 10/2013
(Continued)

OTHER PUBLICATIONS

The World Intellectual Property Organization (WIPO) International Search Report for PCT/CN2016/072143 dated Aug. 19, 2016 pp. 1-5.
The State Intellectual Property Office of the People's Republic of China (SIPO) Office Action 1 for 201510075316.1 dated Mar. 8, 2016 pp. 1-7.

*Primary Examiner* — Ashokkumar B Patel
*Assistant Examiner* — Quazi Farooqui
(74) *Attorney, Agent, or Firm* — Anova Law Group, PLLC (57) ABSTRACT

The present disclosure provides a user information obtaining method and apparatus, and a server. The method includes: sending, after detecting an operation of a terminal for browsing a specified webpage using an Internet application, an authorization page for obtaining user information, the specified webpage being a webpage associated with a specified public identity, the authorization page including an option enabling the terminal to jump to a callback page; obtaining a first authorization credential from address information of the callback page after receiving an authorization confirmation instruction sent by the terminal, the authoriza-
(Continued)

tion confirmation instruction being sent by the terminal after the terminal detects a trigger operation corresponding to the option, and the first authorization credential being added by a first server to the address information; and obtaining user information from the first server according to the first authorization credential, and providing the user information to the specified public identity.

20 Claims, 4 Drawing Sheets

(58) Field of Classification Search
USPC .............................................................. 726/5
See application file for complete search history.

(56) References Cited

U.S. PATENT DOCUMENTS

| | | | |
|---|---|---|---|
| 9,319,457 B2* | 4/2016 | Suni | ......................... H04L 67/10 |
| 2002/0157026 A1 | 10/2002 | Brown | |
| 2013/0086670 A1* | 4/2013 | Vangpat | ................ H04L 9/3213 |
| | | | 726/8 |

FOREIGN PATENT DOCUMENTS

| | | |
|---|---|---|
| CN | 103501265 A | 1/2014 |
| CN | 103634301 A | 3/2014 |
| CN | 103685254 A | 3/2014 |
| CN | 103795692 A | 5/2014 |
| CN | 104754030 A | 7/2015 |

* cited by examiner

USER INFORMATION OBTAINING METHOD AND APPARATUS, AND SERVER BY AN ORGANIZATION TO DELIVER TARGATED DATA TO THE USER

CROSS-REFERENCES TO RELATED APPLICATION

This application is a continuation application of PCT Patent Application No. PCT/CN2016/072143, filed on Jan. 26, 2016, which claims priority to Chinese Patent Application No. 201510075316.1, entitled "USER INFORMATION OBTAINING METHOD AND APPARATUS", filed on Feb. 12, 2015, the entire contents of both of which are incorporated herein by reference.

FIELD OF THE TECHNOLOGY

Embodiments of the present disclosure relate to the field of network technologies, and in particular, to a user information obtaining method and apparatus, and a server.

BACKGROUND OF THE DISCLOSURE

As an application program providing exchange of information such as voices, videos, pictures, and texts to an intelligent terminal, an Internet application is popular among a large number of users with advantages of being capable of sending voices, videos, pictures, and texts across communications operators and operating system platforms. With gradual perfection of functions of the Internet application, a developer or a merchant applies for an application account on an Internet application platform. The developer or the merchant can, based on manners such as texts, pictures, voices, and videos on the Internet application platform by using the application account, implement all-round information pushing to other users using the Internet application platform, or implement communication or interaction with other users.

Further, to provide better services to the other users, so as to remarkably improve user experience, when performing information pushing to the other users by using the application account, the developer or the merchant may generally obtain user information of the other users. The developer or the merchant analyzes habits and preferences of different users according to the user information of the other users, and performs targeted information pushing based on the habits and preferences of the users. However, considering factors such as personal privacy and security, it is not easy for the developer or the merchant to obtain the user information of the other users from a server by using the application account. Therefore, how to obtain the user information is particularly important.

SUMMARY

To resolve the problem in the existing technology, embodiments of the present disclosure provide a user information obtaining method and apparatus, and a server. The technical solutions are as follows:

According to one aspect, a user information obtaining method is provided, including: sending, after detecting an operation of a terminal for browsing a specified webpage by using an Internet application, an authorization page for obtaining user information to the terminal, the specified webpage being a webpage associated with a specified public identity, and the authorization page including an option enabling the terminal to jump to a callback page; obtaining a first authorization credential from address information of the callback page after receiving an authorization confirmation instruction sent by the terminal, the authorization confirmation instruction being sent by the terminal after the terminal detects a trigger operation corresponding to the option, the first authorization credential being added by a first server to the address information of the callback page, and the first server being a server providing services to the Internet application; sending a user information obtaining request to the first server according to the first authorization credential; and receiving the user information returned by the first server, and providing the user information to the specified public identity.

According to another aspect, a user information obtaining apparatus is provided, including: an authorization page sending module, configured to send, after detecting an operation of a terminal for browsing a specified webpage by using an Internet application, an authorization page for obtaining user information to the terminal, the specified webpage being a webpage associated with a specified public identity, and the authorization page including an option enabling the terminal to jump to a callback page; an authorization credential obtaining module, configured to obtain a first authorization credential from address information of the callback page after receiving an authorization confirmation instruction sent by the terminal, the authorization confirmation instruction being sent by the terminal after the terminal detects a trigger operation corresponding to the option, the first authorization credential being added by a first server to the address information of the callback page, and the first server being a server providing services to the Internet application; an information-obtaining-request sending module, configured to send a user information obtaining request to the first server according to the first authorization credential; and a user information receiving module, configured to: receive the user information returned by the first server, and provide the user information to the specified public identity.

According to still another aspect, a server is provided, including: one or more processors; and a memory, the memory storing one or more programs, the one or more programs being configured to be executed by the one or more processors, and the one or more programs including instructions for performing the following operations: sending, after detecting an operation of a terminal for browsing a specified webpage by using an Internet application, an authorization page for obtaining user information to the terminal, the specified webpage being a webpage associated with a specified public identity, and the authorization page including an option enabling the terminal to jump to a callback page; obtaining a first authorization credential from address information of the callback page after receiving an authorization confirmation instruction sent by the terminal, the authorization confirmation instruction being sent by the terminal after the terminal detects a trigger operation corresponding to the option, the first authorization credential being added by a first server to the address information of the callback page, and the first server being a server providing services to the Internet application; sending a user information obtaining request to the first server according to the first authorization credential; and receiving the user information returned by the first server, and providing the user information to the specified public identity.

By implementing the technical solutions provided in the embodiments of the present disclosure, after an operation of a terminal for browsing a specified webpage by using an Internet application is detected, an authorization page for obtaining user information is sent to the terminal. Thereafter, a first authorization credential is obtained from address information of a callback page after an authorization confirmation instruction sent by the terminal by using the authorization page is received, and a user information obtaining request is sent to a first server according to the first authorization credential, so as to obtain the user information. Because authorization data is obtained based on a callback page, and user information is obtained based on the authorization data, security of user information obtaining can be ensured.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementation manners of the present disclosure in detail with reference to the accompanying drawings.

Figure 1:
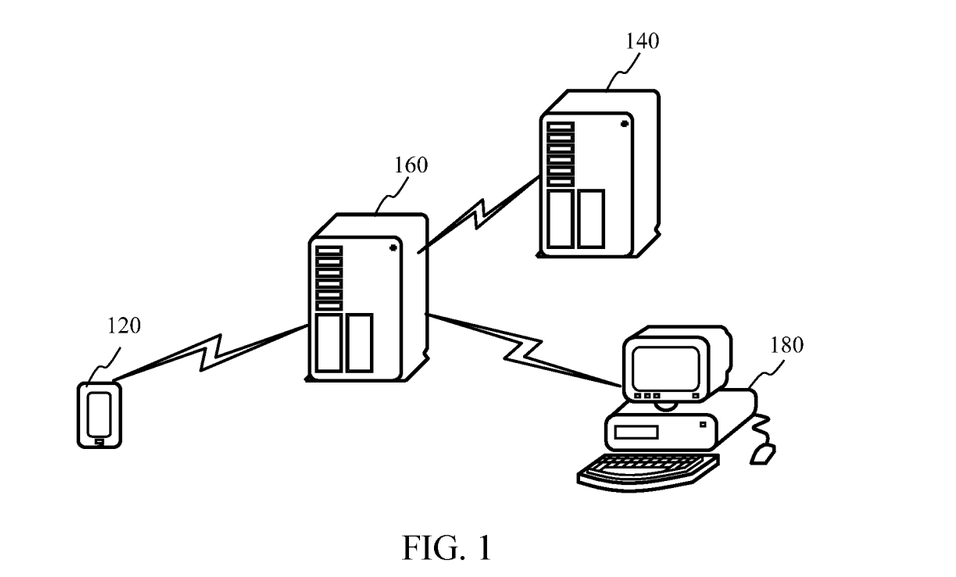
FIG. 1 is a schematic structural diagram of an Internet application system according to an embodiment of the present disclosure.

FIG. 1 is a schematic structural diagram of an Internet application system according to an embodiment of the present disclosure. The Internet application system includes: a terminal 120, a first server 140, a second server 160, and a third-party terminal 180.

The terminal 120 is a terminal, for example, a smartphone, a tablet computer, a portable notebook computer, or a desktop computer, used by a common user. A client of an Internet application is run on the terminal 120. The Internet application may be an application such as an instant messaging application, a social application, a group voice tool, a microblog application, a shopping application, or a payment application. A user generally registers a user account with the Internet application, and obtains various functions provided by the Internet application by using the user account. Using the Internet application being an instant messaging (IM) application as an example, a user can perform various operations besides sending and receiving instant messages, for example, pushing information to other users, receiving information pushed by other users, and setting user information, in the instant messaging application by using a user account. For example, when a first user account publishes and pushes a content, second user accounts subscribed to the first user account may receive the pushed content information. The IM application may further support browsing a page within the application. That is, when a user selects a link included in a message, a default browser of the terminal is not triggered, instead, the IM application retrieves a page related to the link and present the page within a browsing interface of the IM application. In some embodiments, the link may direct to a page related to a public account (e.g., a merchant may register a public account and develop content pages on the IM platform).

The first server 140 and the second server 160 are both background servers of the Internet application ("Internet application servers" for short below). An Internet application server refers to a server providing services by using the Internet. The Internet application server may be an instant messaging server or a social application server, or may be a server being capable of implementing services such as payment by using the Internet. Types of the Internet application server are not specifically limited in this embodiment of the present disclosure. The first server 140 stores user information and provides services to the Internet application; and the second server 160 provides various services to a public identity. For example, a developer or a merchant can perform public identity application, customized menu creation for a public identity, information exchange with a following user, and the like by using the second server 160. The public identity is an application account applied for by a developer or a merchant on the Internet application platform. The developer or the merchant can, based on manners such as texts, pictures, voices, and videos on the Internet application platform by using the public identity, implement all-round information pushing to a large number of users, or implement communication or interaction with a large number of users. For example, the public identity may be an official account applied for by a developer or a merchant on the Internet application platform.

In addition, in this embodiment of the present disclosure, the Internet application servers are divided into the first server 140 and the second server 160 by only considering functions. In an actual application, the first server 140 may be a server, or a server cluster formed by multiple servers, or a cloud computing service center. Similarly, the second server 160 may be a server, or a server cluster formed by multiple servers, or a cloud computing service center. Certainly, in another possible implementation manner, the first server 140 and the second server 160 may be configured to be one server.

The third-party terminal 180 is a terminal, for example, a smartphone, a tablet computer, a portable notebook computer, or a desktop computer, used by an owner of the public identity. The owner of the public identity is generally a developer or a merchant. Certainly, in another possible case, the owner of the public identity may be an institution or an individual, such as an enterprise, a government, media, a celebrity, attracting relatively high user attention. In this embodiment of the present disclosure, the second server 160 may send, after obtaining user information through user authorization, the user information to the third-party terminal 180, thereby providing the user information to the owner of the public identity.

The terminal 120 and the third-party terminal 180 may establish a communication connection with the second server 160 separately by using a wireless network or a wired network.

Figure 2:
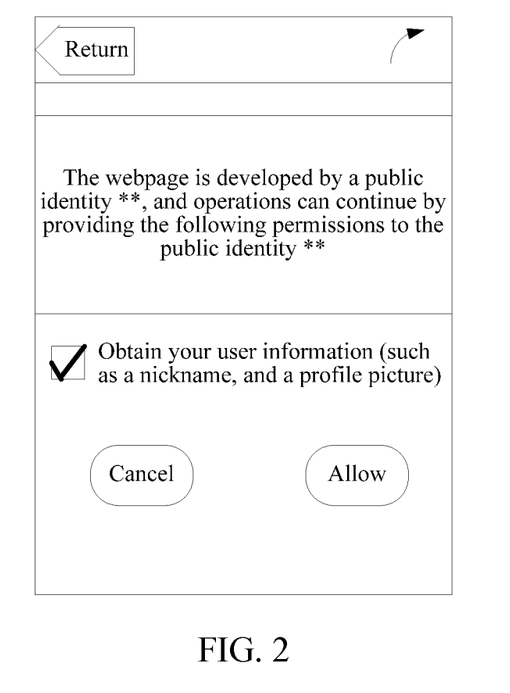
FIG. 2 is a schematic diagram of an authorization page according to an embodiment of the present disclosure.

In this embodiment of the present disclosure, when a user browses a specified webpage associated with a public identity by using the Internet application, the second server 160 inquires, by using an authorization page shown in FIG. 2, of the user about whether to authorize user information to the public identity. If the user clicks an agree option (e.g., the "allow" button in FIG. 2), it is determined that the user agrees to authorize the user information to the public identity, so that the public identity can obtain the user information stored in the first server 140. Alternatively, if the user clicks a cancellation button in FIG. 2, it is determined that the user does not perform authorization, and the public identity cannot obtain the user information in this case.

The user information may include information such as a user nickname, a user profile picture, a user age, a user gender, a country in which the user is located, a province in which the user is located, and a city in which the user is located. This is not specifically limited in this embodiment of the present disclosure. After obtaining the user information, the public identity may provide customized service to the user, and perform data analysis and statistics based on the obtained user information. In this way, the public identity determines habits and preferences of different users according to a statistics result, and improves services of the public identity or pushes related targeted products to the users based on the habits and preferences of different users, thereby improving user experience. For example, the IM platform may further provide an interface for connecting to a third-party database/server corresponding to the public identity. Some of the obtained user information may be stored for providing customized service, such as a correspondence relationship between a membership number and the user account, a correspondence relationship between previous order history and the user account, etc.

Figure 3:
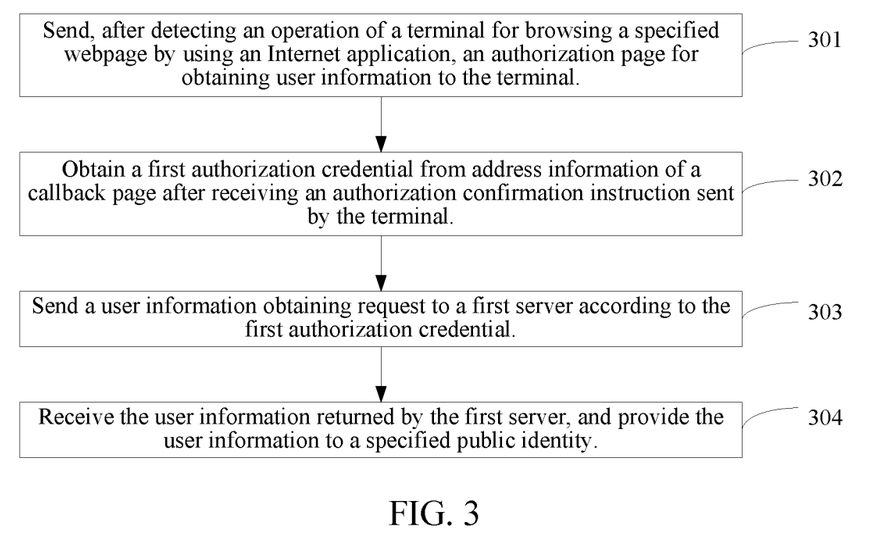
FIG. 3 is a flowchart of a user information obtaining method according to an embodiment of the present disclosure.

FIG. 3 is a flowchart of a user information obtaining method according to an embodiment of the present disclosure. Referring to FIG. 2, a method process provided in this embodiment of the present disclosure may include the following.

301: Sending, after detecting an operation of a terminal for browsing a specified webpage by using an Internet application, an authorization page for obtaining user information to the terminal.

The specified webpage is a webpage associated with a specified public identity, and the authorization page includes an option enabling the terminal to jump to a callback page.

302: Obtaining a first authorization credential from address information of a callback page after receiving an authorization confirmation instruction sent by the terminal.

The authorization confirmation instruction is sent by the terminal after the terminal detects a trigger operation corresponding to the foregoing option of the callback page, the first authorization credential is added by a first server to the address information of the callback page, and the first server is a server providing services to the Internet application.

303: Sending a user information obtaining request to a first server according to the first authorization credential.

304: Receiving the user information returned by the first server, and providing the user information to a specified public identity.

According to the method provided in this embodiment of the present disclosure, after an operation of a terminal for browsing a specified webpage by using an Internet application is detected, an authorization page for obtaining user information is sent to the terminal. Thereafter, a first authorization credential is obtained from address information of a callback page after an authorization confirmation instruction sent by the terminal by using the authorization page is received, and a user information obtaining request is sent to a first server according to the first authorization credential, so as to obtain the user information. Because authorization data is obtained based on a callback page, and user information is obtained based on the authorization data, security of user information obtaining can be ensured.

Optionally, the sending a user information obtaining request to a first server according to the first authorization credential includes: obtaining an identification and a key that correspond to the specified public identity; and sending the user information obtaining request to the first server according to the first authorization credential, and the identification and the key that correspond to the specified public identity.

Optionally, the sending the user information obtaining request to the first server according to the first authorization credential, and the identification and the key that correspond to the specified public identity includes: generating a second authorization credential obtaining request according to the first authorization credential, and the identification and the key that correspond to the specified public identity; sending the second authorization credential obtaining request to the first server; receiving a second authorization credential and a particular identity of a user corresponding to the specified public identity that are returned by the first server; generating the user information obtaining request according to the second authorization credential and the particular identity; and sending the user information obtaining request to the first server.

Optionally, after the sending the second authorization credential obtaining request to the first server, the method further includes: receiving second authorization credential refresh information returned by the first server; and obtaining a refreshed second authorization credential according to the second authorization credential refresh information after the second authorization credential is invalid.

Optionally, after the sending the second authorization credential obtaining request to the first server, the method further includes: generating an authorization data verification request according to the second authorization credential and the particular identity of the user that corresponds to the specified public identity; sending the authorization data verification request to the first server, so that the first server verifies whether the second authorization credential is valid, and verifies that the second authorization credential is valid when the second authorization credential falls within a valid period; and receiving a verification result returned by the first server.

Optionally, before the obtaining a first authorization credential from address information of a callback page, the method further includes: receiving a domain name, of the callback page, configured by the specified public identity; and recording a correspondence between the domain name of the callback page and the specified public identity.

All the foregoing optional technical solutions can form an optional embodiment of the present disclosure by using any combination, and details are not described herein.

Figure 4:
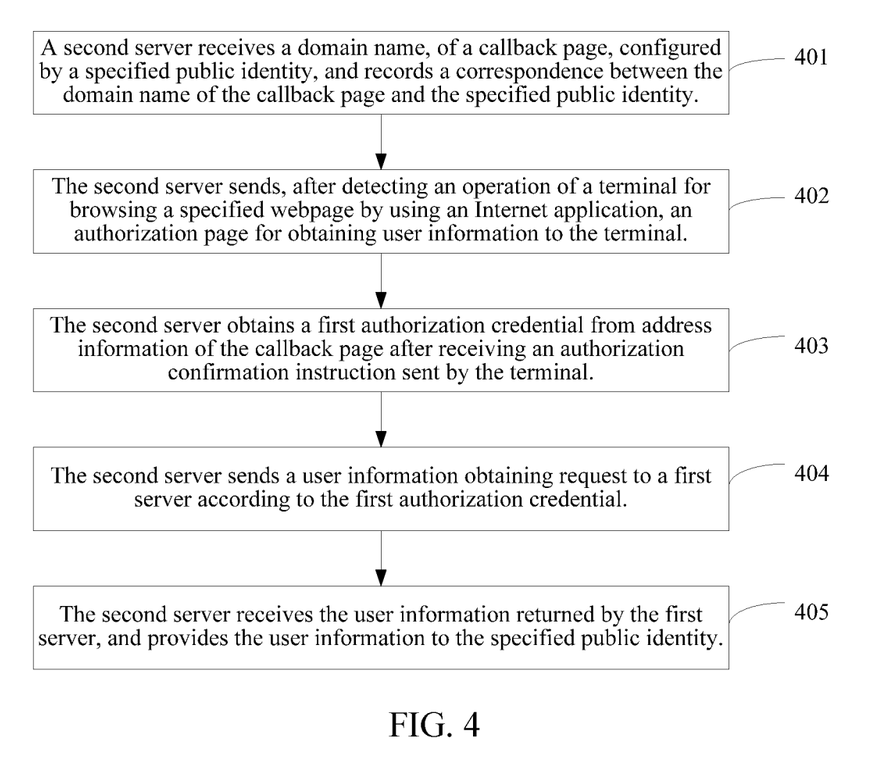
FIG. 4 is a flowchart of a user information obtaining method according to an embodiment of the present disclosure.

FIG. 4 is a flowchart of a user information obtaining method according to an embodiment of the present disclosure. This embodiment performs description by using an example in which a process of the method is applied to the Internet application system shown in FIG. 1. Interaction of the method process is performed by a first server and a second server. Referring to FIG. 4, the method process provided in this embodiment of the present disclosure may include the following.

401: A second server receives a domain name, of a callback page, configured by a specified public identity, and records a correspondence between the domain name of the callback page and the specified public identity.

Figure 5:
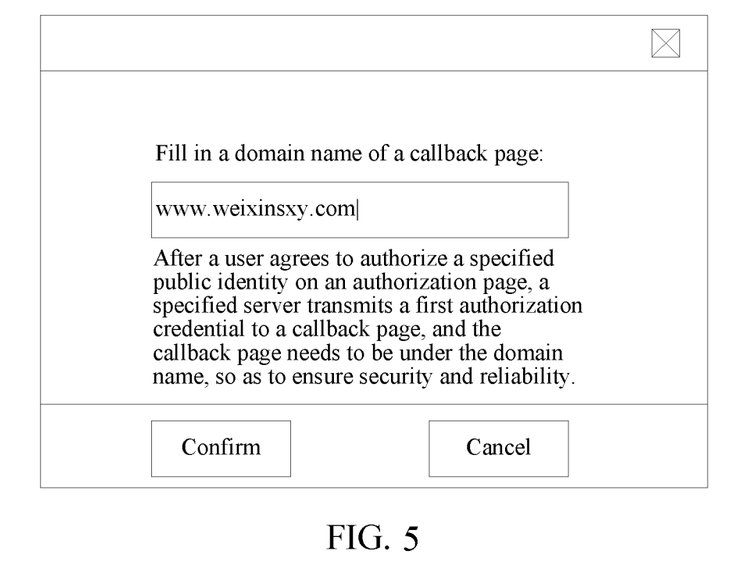
FIG. 5 is a schematic diagram of filling of a domain name of a callback page according to an embodiment of the present disclosure.

In this embodiment of the present disclosure, before the specified public identity obtains user information, a public identity developer further needs to first fill in the domain name of the callback page in a public identity developer center page. The callback page refers to a page redirected after a user terminal performs address jump, after a user agrees to authorize the specified public identity to obtain the user information. When filling in the domain name of the callback page, the public identity developer first searches an interface list of a public identity developer center for an entry in which "webpage authorization for obtaining user basic information" is located, and when the public identity developer clicks a position area of "modification" at the right of the entry, page jump is performed to jump to a fill-in page of the domain name of the callback page. The page is shown in FIG. 5. The public identity developer should fill in a character string, rather than a URL (Uniform Resource Locator) in the page. Therefore, a protocol header such as http:// does not need to be added.

In addition, the domain name of the callback page should be configured as a full domain name. For example, if a domain name needing webpage authorization is www.abc.com, it is configured that pages of http://www.abc.com/music.html and http://www.abc.com/login.html that are under the domain name can both perform the webpage authorization thereafter. The second server receives the domain name of the callback page after the public identity developer configures the domain name of the callback page in the page shown in FIG. 5. Because the second server may store a large number of domain names of callback pages, in order to distinguish domain names of callback pages corresponding to different public identities, the second server may also record correspondences between the domain names of callback pages and the specified public identities. For example, the second server stores a correspondence table, and the correspondence table records the correspondences between the domain names of callback pages and the public identities in detail.

402: The second server sends, after detecting an operation of a terminal for browsing a specified webpage by using an Internet application, an authorization page for obtaining user information to the terminal.

The specified webpage is a webpage associated with the specified public identity, that is, content covered by the specified webpage is associated with the specified public identity, and the content may be related description of a promotion activity that is being performed by a developer or a merchant corresponding to the specified public identity, and the like. This is not specifically limited in this embodiment of the present disclosure. The authorization page, for obtaining the user information, sent by the second server to the terminal is shown in FIG. 2. The authorization page includes an option enabling the terminal to jump to the callback page. The option refers to an allowance button in FIG. 2. After the terminal displays the authorization page on a display interface, if a user clicks the allowance button in the authorization page, that is, the user executes a selection operation of the option, it is confirmed that the user agrees to authorize the specified public identity, and the specified public identity can obtain the user information by using a subsequent process. Alternatively, if a user clicks a cancellation button in the authorization page, that is, the user does not execute a selection operation of the option, it is confirmed that the use does not agree to authorize the specified public identity, and the processing process ends hereto.

It should be noted that when and only when the specified public identity owns a permission of an authorization scope and the scope instructs to obtain the user information, the second server may send the authorization page for obtaining the user information to the terminal. Using the scope represented by a scope parameter as an example, only when the specified public identity owns a permission of the authorization scope parameter and the scope parameter is snsapi_userinfo, the second server may send the authorization page for obtaining the user information to the terminal, that is, the terminal pops up the authorization page shown in FIG. 2. In this case, if a user agrees to perform authorization, the specified public identity can obtain the user information by using the subsequent process even though the user does not follow the specified public identity. If the specified public identity does not own the permission of the authorization scope, or if the specified public identity owns the permission of the authorization scope but the scope does not instruct to obtain the user information, for example, when the scope parameter is snsapi_base, the terminal does not pop up the authorization page shown in FIG. 2, and page jump is directly performed, so that the specified public identity cannot obtain the user information such as a user nickname or a user gender.

Address information of the authorization page may be represented by the following pseudocode:

https://open.weixin.qq.com/connect/oauth2/authorize?appid=APPID&redirect_uri=REDIRECT_URI&response_type=code&scope=SCOPE&state=STATE#wechat_redirect When the scope parameter is snsapi_base, the address information of foregoing authorization page may be like the following pseudocode:

https://open.weixin.qq.com/connect/oauth2/authorize?appid=wx520c15f417810387&redirect_uri=http%3A%2F%2Fchong.qq.-com%2Fphp%2Findex.php%3Fd%3D%26c%3DwxAdapter%26m%-3DmobileDeal%26showwxpaytitle%3D1%26vb2ctag%-3D4_2030_5_1194_60&response_type=code&scope=snsapi_base&state=123#wechat_redirect When the scope parameter is snsapi_userinfo, the address information of foregoing authorization page may be like the following pseudocode:

https://open.weixin.qq.com/connect/oauth2/authorize?appid=wxf0e81c3bee622d60&redirect_uri=http%3A%2F%2Fnba.bluewebgame.com%2Foauth_response.php&response_type=code&scope=snsapi_userinfo&state=STATE#wechat_redirect

403: The second server obtains a first authorization credential from address information of the callback page after receiving an authorization confirmation instruction sent by the terminal.

In this embodiment of the present disclosure, the authorization confirmation instruction is sent by the terminal after the terminal detects a trigger operation of an option enabling the terminal to jump to the callback page, that is, after the terminal detects that a user clicks an allowance button in the authorization page shown in FIG. 2, the terminal sends the authorization confirmation instruction to the second server. When the terminal sends the authorization confirmation instruction to the second server, the second server requests to obtain the first authorization credential from the first server. After receiving the credential obtaining request, the first server adds the first authorization credential to the address information of the callback page, and transmits the first authorization credential to the terminal side by using the callback page. Because a user agrees to perform authorization, the terminal performs page jump to jump to the callback page redirect_uri/?code=CODE&state=STATE. The redirect_uri refers to an address of the callback page redirected after user authorization; the code refers to the first authorization credential; and the state refers to a state parameter carried after redirection, and a public identity developer can fill in a state parameter value. If a user does not agree to perform authorization, the callback page does not transmit the first authorization credential and only carries a state parameter, that is, an address of the callback page is redirect_uri?state=STATE.

It should be noted that the code serves as a ticket for obtaining a second authorization credential (access_token) in a subsequent process. A parameter value of the code returned each time the user agrees to perform authorization is different, and the code can only be used once, and expires automatically if being not used within a valid period of the code. The valid period of the code can be preset according to actual requirements, for example, preset to 5 minutes.

404: The second server sends a user information obtaining request to a first server according to the first authorization credential.

In this embodiment of the present disclosure, after obtaining the first authorization credential (code), the second server further needs to obtain a second authorization credential (access_token) according to the first authorization credential, and sends, based on the two authorization credentials, the user information obtaining request to the first server to obtain the user information. A detailed process is as follows:

Step one: Obtaining an identification and a key that correspond to the specified public identity.

In this embodiment of the present disclosure, the identification and the key that correspond to the specified public identity refer to an appid and a secret respectively. On stages of registration and function development of the public identity, the second server allocates an appid and a secret for each public identity, and stores the appid and the secret in a public identity developer center page. Therefore, when the appid and the secret that correspond to the specified public identity are to be obtained, the appid and the secret that correspond to the specified public identity can be obtained from the public identity developer center page according to the specified public identity. Certainly, besides the foregoing obtaining of the identification and the key that correspond to the specified public identity, another obtaining method may also be adopted. This is not specifically limited in this embodiment of the present disclosure.

Step two: Generating a second authorization credential obtaining request according to the first authorization credential, and the identification and the key that correspond to the specified public identity.

In this embodiment of the present disclosure, after obtaining the first authorization credential, and the identification and the key that correspond to the specified public identity, the second server may generate the second authorization credential obtaining request in a following link form according to the first authorization credential, the identification and the key, and obtain a second authorization credential according to the following link:

https://api.weixin.qq.com/sns/oauth2/access_token?appid=APPID&secret=SECRET&code=CODE&grant_type=authorization_code The grant_type is an authorization type parameter, and is filled in as authorization_code.

Step three: Sending the second authorization credential obtaining request to the first server.

It should be noted that the access_token mentioned in this embodiment of the present disclosure is a ticket dedicated to obtaining the user information in a webpage authorization process, and is different from an access_token in general basic support. The access_token in the basic support is used for calling various interfaces to perform public identity development, information exchange between a public identity and a user, or the like.

Step four: Receiving a second authorization credential and a particular identity of a user corresponding to the specified public identity that are returned by the first server.

In this embodiment of the present disclosure, when returning the second authorization credential, the first server generally returns a JSON (JavaScript Object Notation) data packet, and a format of the JSON data packet is as follows:

```
{ "access_token":"ACCESS_TOKEN",
  "expires_in":7200,
  "refresh_token":"REFRESH_TOKEN",
  "openid":"OPENID",
  "scope":"SCOPE"}
```

It can be seen that besides the access_token, the JSON data packet further includes parameters such as an expires_in, a refresh_token, an openid, and a scope. The parameter expires_in is used for identifying a valid period, generally being 7200 seconds, of the access_token; the parameter refresh_token may be used for refreshing the access_token after the access_token is invalid; the openid refers to the particular identity of the user corresponding to the specified public identity; for a user, an openid is allocated to the user to identify a relationship between the user and the specified public identity no matter whether the user follows the specified public identity; and the parameter scope refers to a user authorization scope.

It should be noted that if the code is invalid, the first server may return an error prompt in the following form: {"errcode":40029, "errmsg":"invalid code"}.

Step five: Generating a user information obtaining request according to the second authorization credential and the particular identity.

In this embodiment of the present disclosure, after the second authorization credential access_token and the particular identity openid are obtained, if an authorization scope is snsapi_userinfo, the user information obtaining request in the following form may be generated based on the access_token and the openid:

```
http: GET (using a https protocol)
    https://api.weixin.qq.com/sns/userinfo?access_token=
  ACCESS_TOKEN&openid=OPENID&lang=zh_CN
```

The lang refers to a language version of a returned country or area; and the zh_CN refers to simplified Chinese, zh_TW refers to traditional Chinese, and en refers to English.

Step six: Sending the user information obtaining request to the first server.

In this embodiment of the present disclosure, because the valid period of the access_token is relatively short (generally being 7200 seconds), if it is found that the access_token expires during use of the access_token, the parameter refresh_token obtained in step four may be used to refresh the access_token. The refresh_token owns a longer valid period (which may be 7 days, 30 days, 60 days, 90 days, or the like). If the refresh_token is invalid, the user needs to perform authorization again. When a new access_token is requested according to the parameter refresh_token, the following credential obtaining request may be sent to the first server to obtain a refreshed access_token:

https://api.weixin.qq.com/sns/oauth2/refresh_token?appid=APPID&grant_type=refresh_token&refresh_token=REFRESH_TOKEN When the first server correctly returns the refreshed access_token, a JSON data packet is also received, and a format of the JSON data packet is as follows:

```
{ "access_token":"ACCESS_TOKEN",
  "expires_in":7200,
  "refresh_token":"REFRESH_TOKEN",
  "openid":"OPENID",
  "scope":"SCOPE"}
```

It can be known from the foregoing content that the JSON data packet includes parameters such as an access_token, an expires_in, a refresh_token, an openid, and a scope.

405: The second server receives the user information returned by the first server, and provides the user information to the specified public identity.

In this embodiment of the present disclosure, the first server also returns the user information in a JSON data packet form. A format of the JSON data packet is as follows:

```
{
  "openid":" OPENID",
  " nickname": NICKNAME,
  "sex":"1",
  "province":"PROVINCE"
  "city":"CITY",
  "country":"COUNTRY",
  "headimgurl":
"http://wx.qlogo.cn/mmopen/g3MonUZtNHkdmzicIlibx6iaFqAc56vx-
LSUfpb6n5WKSYVY0ChQKkiaJSgQ1dZuTOgvLLrhJbERQQ4eMsv84-
eavHiaiceqxibJxCfHe/46",
        "privilege":[
          "PRIVILEGE1"
          "PRIVILEGE2"
        ]
        "unionid": "o6_bmasdasdsad6_2sgVt7hMZOPfL"
}
```

It can be seen that the JSON data packet may include parameters such as an openid, a nickname, a sex, a province, a city, a country, a headimgurl, a privilege, and a unionid. The nickname represents a user nickname; the sex represents a user gender, a value being 1 referring to a male, a vale being 2 referring to a female, and a vale being 0 referring to an unknown user gender; the province represents a province in which a user is located that is filled in by the user when filing in personal information; the city represents a city in which a user is located that is filled in by the user when filling in personal information; the country represents a country in which a user is located that is filled in by the user when filling in personal information; and the headimgurl represents a user profile picture, a last value representing a size of a square profile picture (there are values such as 0, 46, 64, 96, and 132 for choosing, and 0 represents a square profile picture of 640*640), and the entry being null when there is no user profile picture. If a user changes a profile picture, a URL of the original profile picture becomes invalid; the privilege represents user privilege information; and the field unionid only appears after a user follows the specified public identity.

It should be noted that if the access_token in the user information obtaining request is invalid or the openid in the user information obtaining request is incorrect, the first server may return error information. Using the openid being incorrect as an example, the first server may return error information such as "errcode":40003, "errmsg":"invalid openid".

In addition, the second server may also verify whether the second authorization credential is valid, and a detailed process is: generating an authorization data verification request according to the access_token and the openid; sending the authorization data verification request to the first server, so that the first server verifies whether the access_token is valid, and verifies that the access_token is valid if the access_token falls within a valid period and is the same as a delivered authorization credential; and returning a verification result by the first server to the second server. Certainly, besides the foregoing verification manner, another verification manner may also be adopted. This is not specifically limited in this embodiment of the present disclosure.

In this embodiment of the present disclosure, after obtaining the user information, the second server may send the user information to a third-party server. The third-party server sends the user information to a third-party terminal corresponding to the public identity, so that the third-party terminal corresponding to the public identity improves services of the third-party terminal or performs targeted data pushing to a large number of users based on the obtained user information.

Optionally, the user information includes multiple different types of information such as a user nickname, a user profile picture, a user age, a user gender, and an area in which a user is located. A user may select, in a customized manner, to authorize the specified public identity to obtain all or some types of the user information. In a possible implementation manner, the authorization page further includes several options corresponding to different types of the user information, for example, options corresponding to different types of the user information such as the user nickname, the user profile picture, the user age, the user gender, and the area in which a user is located. A user may select, in the authorization page, a target type corresponding to the user information that the specified public identity is authorized to obtain. For example, a user checks, in the authorization page, three types of the user information: the user nickname, the user profile picture, and the user age, to authorize the specified public identity to obtain the three types of the user information, and the specified public identity is not authorized to obtain other types of the user information such as the user gender and the area in which a user is located. Correspondingly, the second server obtains the target type selected by the user in the authorization page, and then the foregoing target type is carried in the user information obtaining request sent to the first server, so as to obtain the user information of the target type from the first server. By means of the foregoing manner, authorization of the user information is more independent and more flexible.

According to the method provided in this embodiment of the present disclosure, after an operation of a terminal for browsing a specified webpage by using an Internet application is detected, an authorization page for obtaining user information is sent to the terminal. Thereafter, a first authorization credential is obtained from address information of a callback page after an authorization confirmation instruction sent by the terminal by using the authorization page is received, a second authorization credential is obtained according to the first authorization credential, and a user information obtaining request is sent to a first server according to the first authorization credential and the second authorization credential, so as to obtain the user information. Because authorization data is obtained based on a callback page, and user information is obtained based on the authorization data, security of user information obtaining can be ensured.

Figure 6:
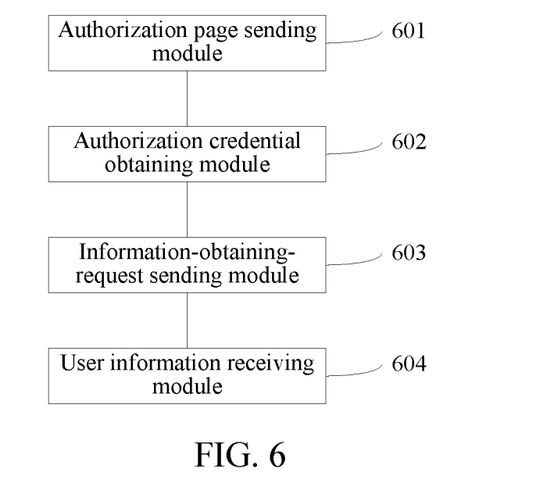
FIG. 6 is a schematic structural diagram of a user information obtaining apparatus according to an embodiment of the present disclosure.

FIG. 6 is a schematic structural diagram of a user information obtaining apparatus according to an embodiment of the present disclosure. Referring to FIG. 6, the apparatus includes a plurality of program modules for being executed by one or more processor. The program modules may include: an authorization page sending module 601, an authorization credential obtaining module 602, an information-obtaining-request sending module 603, and a user information receiving module 604.

The authorization page sending module 601 is connected to the authorization credential obtaining module 602, and is configured to send, after detecting an operation of a terminal for browsing a specified webpage by using an Internet application, an authorization page for obtaining user information to the terminal, the specified webpage being a webpage associated with a specified public identity, and the authorization page including an option enabling the terminal to jump to a callback page; the authorization credential obtaining module 602 is connected to the information-obtaining-request sending module 603, and is configured to obtain a first authorization credential from address information of the callback page after receiving an authorization confirmation instruction sent by the terminal, the authorization confirmation instruction being sent by the terminal after the terminal detects a selection operation of the option, the first authorization credential being added by a first server to the address information, and the first server being a server providing services to the Internet application; the information-obtaining-request sending module 603 is connected to the user information receiving module 604, and is configured to send a user information obtaining request to the first server according to the first authorization credential; and the user information receiving module 604 is configured to: receive the user information returned by the first server, and send the user information to the specified public identity.

Optionally, the information-obtaining-request sending module 603 is configured to: obtain an identification and a key that correspond to the specified public identity; and send the user information obtaining request to the first server according to the first authorization credential, and the identification and the key that correspond to the specified public identity.

Optionally, the information-obtaining-request sending module 603 is configured to: generate a second authorization credential obtaining request according to the first authorization credential, and the identification and the key that correspond to the specified public identity; send the second authorization credential obtaining request to the first server; receive a second authorization credential and a particular identity of a user corresponding to the specified public identity that are returned by the first server; generate the user information obtaining request according to the second authorization credential and the particular identity; and send the user information obtaining request to the first server.

Optionally, the apparatus further includes: a credential refresh information receiving module, configured to receive second authorization credential refresh information returned by the first server, the authorization credential obtaining module being further configured to obtain a refreshed second authorization credential according to the second authorization credential refresh information after the second authorization credential is invalid.

Optionally, the apparatus further includes: an authorization data verification request generation module, configured to generate an authorization data verification request according to the second authorization credential and the particular identity of the user that corresponds to the specified public identity; an authorization data verification request sending module, configured to send the authorization data verification request to the first server, so that the first server verifies whether the second authorization credential is valid, and verifies that the second authorization credential is valid when the second authorization credential falls within a valid period and is the same as a delivered authorization credential; and a verification result receiving module, configured to receive a verification result returned by the first server.

Optionally, the apparatus further includes: a domain name receiving module, configured to receive a domain name, of the callback page, configured by the specified public identity; and a correspondence recording module, configured to record a correspondence between the domain name of the callback page and the specified public identity.

In conclusion, according to the apparatus provided in this embodiment of the present disclosure, after an operation of a terminal for browsing a specified webpage by using an Internet application is detected, an authorization page for obtaining user information is sent to the terminal. Thereafter, a first authorization credential is obtained from address information of a callback page after an authorization confirmation instruction sent by the terminal by using the authorization page is received, a second authorization credential is obtained according to the first authorization credential, and a user information obtaining request is sent to a first server according to the first authorization credential and the second authorization credential, so as to obtain the user information. Because authorization data is obtained based on a callback page, and user information is obtained based on the authorization data, security of user information obtaining can be ensured.

It should be noted that division of the above functional modules are only described as an example when the user information obtaining apparatus provided in the foregoing embodiments obtains user information. In actual applications, the functions may be allocated according to needs to be implemented by different functional modules, that is, the internal structure of the apparatus is divided into different functional modules to complete all or some of the above described functions. In addition, the user information obtaining apparatus provided in the foregoing embodiment is based on the same concept as the user information obtaining method in the foregoing embodiments. For the specific implementation process, refer to the method embodiments, and details are not described herein again.

Figure 7:
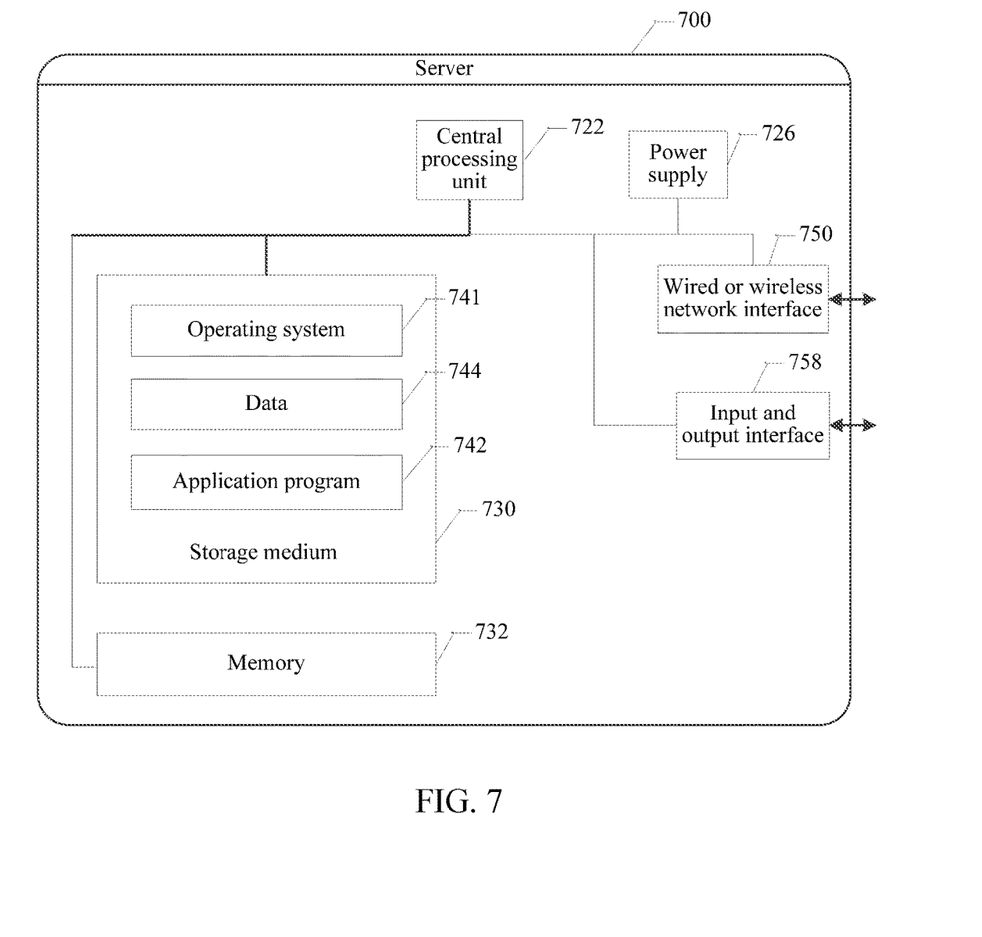
FIG. 7 is a schematic structural diagram of a server according to an embodiment of the present disclosure.

FIG. 7 is a schematic structural diagram of a server according to an embodiment of the present disclosure. The server may be configured to execute the user information obtaining method executed by the second server in the foregoing embodiment. Referring to FIG. 7, the server 700 may have relatively large difference due to difference of configuration or performance, and may include one or more central processing units (CPU) 722 (for example, one or more processors) and a memory 732, and one or more storage mediums 730 (for example, one or more mass storage devices) storing an application program 742 or data 744. The memory 732 and the storage medium 730 may perform transient or persistent storage. The program stored in the storage medium 730 may include one or more modules (not marked in the figure), and each module may include a series of instruction operations to the server. Further, the central processing unit 722 may be set to communicate with the storage medium 730, and execute, on the server 700, the series of instruction operations stored in the storage medium 730.

The server 700 may further include one or more power supplies 726, one or more wired or wireless network interfaces 750, one or more input and output interfaces 758, and/or one or more operating systems 741, for example, a Windows Server™, a Mac OS X™, a Unix™, a Linux™, and a FreeBSD™.

Specifically, in this embodiment, the one or more programs being configured to be executed by the one or more processors include instructions for performing the following operations: sending, after detecting an operation of a terminal for browsing a specified webpage by using an Internet application, an authorization page for obtaining user information to the terminal, the specified webpage being a webpage associated with a specified public identity, and the authorization page including an option enabling the terminal to jump to a callback page; obtaining a first authorization credential from address information of the callback page after receiving an authorization confirmation instruction sent by the terminal, the authorization confirmation instruction being sent by the terminal after the terminal detects a trigger operation corresponding to the option, the first authorization credential being added by a first server to the address information of the callback page, and the first server being a server providing services to the Internet application; sending a user information obtaining request to the first server according to the first authorization credential; and receiving the user information returned by the first server, and providing the user information to the specified public identity.

Optionally, the sending a user information obtaining request to the first server according to the first authorization credential includes: obtaining an identification and a key that correspond to the specified public identity; and sending the user information obtaining request to the first server according to the first authorization credential, and the identification and the key that correspond to the specified public identity.

Optionally, the sending the user information obtaining request to the first server according to the first authorization credential, and the identification and the key that correspond to the specified public identity includes: generating a second authorization credential obtaining request according to the first authorization credential, and the identification and the key that correspond to the specified public identity; sending the second authorization credential obtaining request to the first server; receiving a second authorization credential and a particular identity of a user corresponding to the specified public identity that are returned by the first server; generating the user information obtaining request according to the second authorization credential and the particular identity; and sending the user information obtaining request to the first server.

Optionally, after the sending the second authorization credential obtaining request to the first server, the method further includes: receiving second authorization credential refresh information returned by the first server; and obtaining a refreshed second authorization credential according to the second authorization credential refresh information after the second authorization credential is invalid.

Optionally, after the sending the second authorization credential obtaining request to the first server, the method further includes: generating an authorization data verification request according to the second authorization credential and the particular identity of the user that corresponds to the specified public identity; sending the authorization data verification request to the first server, so that the first server verifies whether the second authorization credential is valid, and verifies that the second authorization credential is valid when the second authorization credential falls within a valid period; and receiving a verification result returned by the first server.

Optionally, before the obtaining a first authorization credential from address information of the callback page, the method further includes: receiving a domain name, of the callback page, configured by the specified public identity; and recording a correspondence between the domain name of the callback page and the specified public identity.

In conclusion, according to the server provided in this embodiment of the present disclosure, after an operation of a terminal for browsing a specified webpage by using an Internet application is detected, an authorization page for obtaining user information is sent to the terminal. Thereafter, a first authorization credential is obtained from address information of a callback page after an authorization confirmation instruction sent by the terminal by using the authorization page is received, a second authorization credential is obtained according to the first authorization credential, and a user information obtaining request is sent to a first server according to the first authorization credential and the second authorization credential, so as to obtain the user information. Because authorization data is obtained based on a callback page, and user information is obtained based on the authorization data, security of user information obtaining can be ensured.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely an example of the embodiments of the present invention, and is not intended to limit the present disclosure. Any modifications, equivalent variations, and improvements made in accordance with the spirits and principles of the present disclosure shall fall within the protection scope of the present disclosure.

What is claimed is:

1. A user information obtaining method, comprising:
sending, by a public account server, after detecting an operation of a user terminal for browsing a specified webpage by using an Internet messaging application, an authorization page for obtaining user information to the user terminal, the specified webpage being a webpage associated with a specified public identity, and the authorization page comprising an option enabling the user terminal to jump to a callback page, wherein the public account server is providing services to public identities registered with a platform of the Internet messaging application by developers or merchants to implement communications or interactions with users of the Internet messaging application;

obtaining, by the public account server, a first authorization credential from address information of the callback page after receiving an authorization confirmation instruction sent by the user terminal, the authorization confirmation instruction being sent by the user terminal after the user terminal detects a trigger operation corresponding to the option, the first authorization credential being added by a messaging application server to the address information of the callback page, wherein the messaging application server is providing services to the Internet messaging application and stores information of the users of the Internet messaging application, and the first authorization credential added by the messaging application server to the address information of the callback page is unique each time;

sending, by the public account server, a user information obtaining request to the messaging application server according to the first authorization credential; and receiving, by the public account server, the user information returned by the messaging application server, and providing the user information to the specified public identity.

2. The method according to claim 1, the sending a user information obtaining request to the messaging application server according to the first authorization credential comprising:

obtaining an identification and a key that correspond to the specified public identity; and sending the user information obtaining request to the messaging application server according to the first authorization credential, and the identification and the key that correspond to the specified public identity.

3. The method according to claim 2, the sending the user information obtaining request to the messaging application server according to the first authorization credential, and the identification and the key that correspond to the specified public identity comprising:

generating a second authorization credential obtaining request according to the first authorization credential, and the identification and the key that correspond to the specified public identity;

sending the second authorization credential obtaining request to the messaging application server;

receiving a second authorization credential and a particular identity of a user corresponding to the specified public identity that are returned by the messaging application server;

generating the user information obtaining request according to the second authorization credential and the particular identity; and sending the user information obtaining request to the messaging application server.

4. The method according to claim 3, after the sending the second authorization credential obtaining request to the messaging application server, further comprising:

receiving second authorization credential refresh information returned by the first messaging application server; and obtaining a refreshed second authorization credential according to the second authorization credential refresh information after the second authorization credential is invalid.

5. The method according to claim 3, after the sending the second authorization credential obtaining request to the messaging application server, further comprising:

gene rating an authorization data verification request according to the second authorization credential and the particular identity;

sending the authorization data verification request to the messaging application server, wherein the messaging application server verifies whether the second authorization credential is valid, and verifies that the second authorization credential is valid when the second authorization credential falls within a valid period and is the same as a delivered authorization credential; and receiving a verification result returned by the messaging application server.

6. The method according to claim 5, wherein the first authorization credential added by the messaging application server in the address information of the callback page is associated with the valid period; and the first authorization credential serves as a ticket for obtaining the second authorization credential.

7. The method according to claim 1, before the obtaining a first authorization credential from address information of the callback page, further comprising:

receiving, by the public account server, a domain name, of the callback page, inputted by the specified public identity through a graphical user interface; and recording, by the public account server, a correspondence between the domain name of the callback page and the specified public identity.

8. The method according to claim 1, wherein:

when the selected option on the authorization page indicates that a user authorizes the user information obtaining request, the address information of the callback page includes the first authorization credential added by the messaging application server and a state parameter, and the first authorization credential is a code directly embedded in and is a part of the address information of the callback page; and when the selected option on the authorization page indicates that a user does not authorize the user information obtaining request, the address information of the callback page includes the state parameter and does not carry the first authorization credential.

9. A non-transitory computer-readable storage medium storing computer program instructions executable by at least one processor of a public account server to perform:

sending, after detecting an operation of a user terminal for browsing a specified webpage by using an Internet messaging application, an authorization page for obtaining user information to the user terminal, the specified webpage being a webpage associated with a specified public identity, and the authorization page comprising an option enabling the user terminal to jump to a callback page, wherein the public account server is providing services to public identities registered with a platform of the Internet messaging application by developers or merchants to implement communications or interactions with users of the Internet messaging application;

obtaining a first authorization credential from address information of the callback page after receiving an authorization confirmation instruction sent by the terminal, the authorization confirmation instruction being sent by the user terminal, the authorization confirmation instruction being sent by the user terminal after the user terminal detects a trigger operation corresponding to the option, the first authorization credential being added by a messaging application server to the address information of the callback page, wherein the messaging application server is providing services to the Internet messaging application and stores information of the users of the Internet messaging application, and the first authorization credential added by the messaging application server to the address information of the callback page is unique each time;

sending a user information obtaining request to the messaging application server according to the first authorization credential; and receiving the user information returned by the messaging application server, and providing the user information to the specified public identity.

10. The storage medium according to claim 9, wherein sending the user information obtaining request to the messaging application server comprises:

obtaining an identification and a key that correspond to the specified public identity; and sending the user information obtaining request to the messaging application server according to the first authorization credential, and the identification and the key that correspond to the specified public identity.

11. The storage medium according to claim 10, wherein sending the user information obtaining request to the messaging application server comprises:

generating a second authorization credential obtaining request according to the first authorization credential, and the identification and the key that correspond to the specified public identity;

sending the second authorization credential obtaining request to the messaging application server;

receiving a second authorization credential and a particular identity of a user corresponding to the specified public identity that are returned by the messaging application server;

generating the user information obtaining request according to the second authorization credential and the particular identity; and sending the user information obtaining request to the messaging application server.

12. The storage medium according to claim 11, wherein the computer program instructions further cause the at least one processor to perform:

receiving second authorization credential refresh information returned by the messaging application server; and obtaining a refreshed second authorization credential according to the second authorization credential refresh information after the second authorization credential is invalid.

13. The storage medium according to claim 11, wherein the computer program instructions further cause the at least one processor to perform:

generating an authorization data verification request according to the second authorization credential and the particular identity;

sending the authorization data verification request to the messaging application server, wherein the messaging application server verifies whether the second authorization credential is valid, and verifies that the second authorization credential is valid when the second authorization credential falls within a valid period and is the same as a delivered authorization credential; and receiving a verification result returned by the messaging application server.

14. The storage medium according to claim 9, wherein the computer program instructions further cause the at least one processor to perform:

receiving a domain name, of the callback page, configured by the specified public identity through a graphical user interface; and recording a correspondence between the domain name of the callback page and the specified public identity.

15. A public account server, comprising:

one or more processors; and a memory, the memory storing one or more programs, the one or more programs being configured to be executed by the one or more processors, and the one or more programs comprising instructions for performing the following operations:

sending, after detecting an operation of a user terminal for browsing a specified webpage by using an Internet messaging application, an authorization page for obtaining user information to the user terminal, the specified webpage being a webpage associated with a specified public identity, and the authorization page comprising an option enabling the user terminal to jump to a callback page, wherein the public account server is providing services to public identities registered with a platform of the Internet messaging application by developers or merchants to implement communications or interactions with users of the Internet messaging application;

obtaining a first authorization credential from address information of the callback page after receiving an authorization confirmation instruction sent by the user terminal, the authorization confirmation instruction being sent by the user terminal after the user terminal detects a trigger operation corresponding to the option, the first authorization credential being added by a messaging application server to the address information of the callback page, wherein the messaging application server is providing services to the Internet messaging application and stores information of the users of the Internet messaging application, and the first authorization credential added by the messaging application server to the address information of the callback page is unique each time;

sending a user information obtaining request to the messaging application server according to the first authorization credential; and receiving the user information returned by the messaging application server, and providing the user information to the specified public identity.

16. The public account server according to claim 15, the one or more programs further comprising instructions for performing the following operations:

obtaining an identification and a key that correspond to the specified public identity; and sending the user information obtaining request to the messaging application server according to the first authorization credential, and the identification and the key that correspond to the specified public identity.

17. The public account server according to claim 16, the one or more programs further comprising instructions for performing the following operations:

generating a second authorization credential obtaining request according to the first authorization credential, and the identification and the key that correspond to the specified public identity;

sending the second authorization credential obtaining request to the messaging application server;

receiving a second authorization credential and a particular identity of a user corresponding to the specified public identity that are returned by the messaging application server;

generating the user information obtaining request according to the second authorization credential and the particular identity; and sending the user information obtaining request to the messaging application server.

18. The public account server according to claim 17, the one or more programs further comprising instructions for performing the following operations:

receiving second authorization credential refresh information returned by the messaging application server; and obtaining a refreshed second authorization credential according to the second authorization credential refresh information after the second authorization credential is invalid.

19. The public account server according to claim 17, the one or more programs further comprising instructions for performing the following operations:

gene rating an authorization data verification request according to the second authorization credential and the particular identity;

sending the authorization data verification request to the messaging application server, wherein the messaging application server verifies whether the second authorization credential is valid, and verifies that the second authorization credential is valid when the second authorization credential falls within a valid period and is the same as a delivered authorization credential; and receiving a verification result returned by the messaging application server.

20. The public account server according to claim 15, the one or more programs further comprising instructions for performing the following operations:

receiving a domain name, of the callback page, configured by the specified public identity; and recording a correspondence between the domain name of the callback page and the specified public identity.

* * * * *